March 16, 1937.   T. LAURITZ   2,073,640
CAMERA
Filed July 27, 1935   4 Sheets-Sheet 1

INVENTOR.
Thor Lauritz
BY
ATTORNEYS

March 16, 1937.                    T. LAURITZ                    2,073,640
                                    CAMERA
                              Filed July 27, 1935            4 Sheets-Sheet 4

INVENTOR.
Thor Lauritz
BY
ATTORNEYS

Patented Mar. 16, 1937

2,073,640

UNITED STATES PATENT OFFICE 2,073,640

CAMERA

Thor Lauritz, Los Angeles, Calif.

Application July 27, 1935, Serial No. 33,500

10 Claims. (Cl. 95—49)

This invention relates to photographic cameras and has to do particularly with film supporting and shifting mechanisms and film numbering devices for use in cameras.

In my United States Patent No. 1,992,223, granted to me on February 26th, 1935, I have disclosed a magazine camera for using cut-film. The important characteristic of that camera is that it handles cut-film without employing individual holders, thereby making it possible to initially load into the camera a large number of films. By means of an ingenious mechanism the films are shifted into an exposed-film magazine as they are exposed.

The present invention relates to further improvements in the camera disclosed in my patent above referred to, although some features of the invention may also be employed in cameras of different construction.

An object of the invention is to provide a removable film magazine having an opening for receiving films and a light tight door for the opening, which door is automatically opened when the magazine is inserted in the camera and automatically closed when the magazine is removed from the camera whereby the magazine may be removed in the light without danger of fogging the films therein.

Another object is to provide a quiet and positive clutch mechanism to prevent premature reverse movement of an actuating member reciprocable through a predetermined stroke.

Another object is to provide in a magazine camera of the type disclosed in my Patent No. 1,992,223 a simple and effective mechanism for locking the film-shifting mechanism against movement when the supply of films is exhausted.

Another object is to prevent bulging of films when in exposure position in magazine cameras of the type disclosed in my Patent No. 1,992,223.

Another object is to provide a simple and effective numbering device for producing identifying marks on films in a camera as the films are exposed.

Other minor objects and features of the invention will be apparent from the following detailed description of the construction and operation of a typical embodiment of the invention, the description referring to the drawings in which.

General construction and operation

Figures 1, 7:
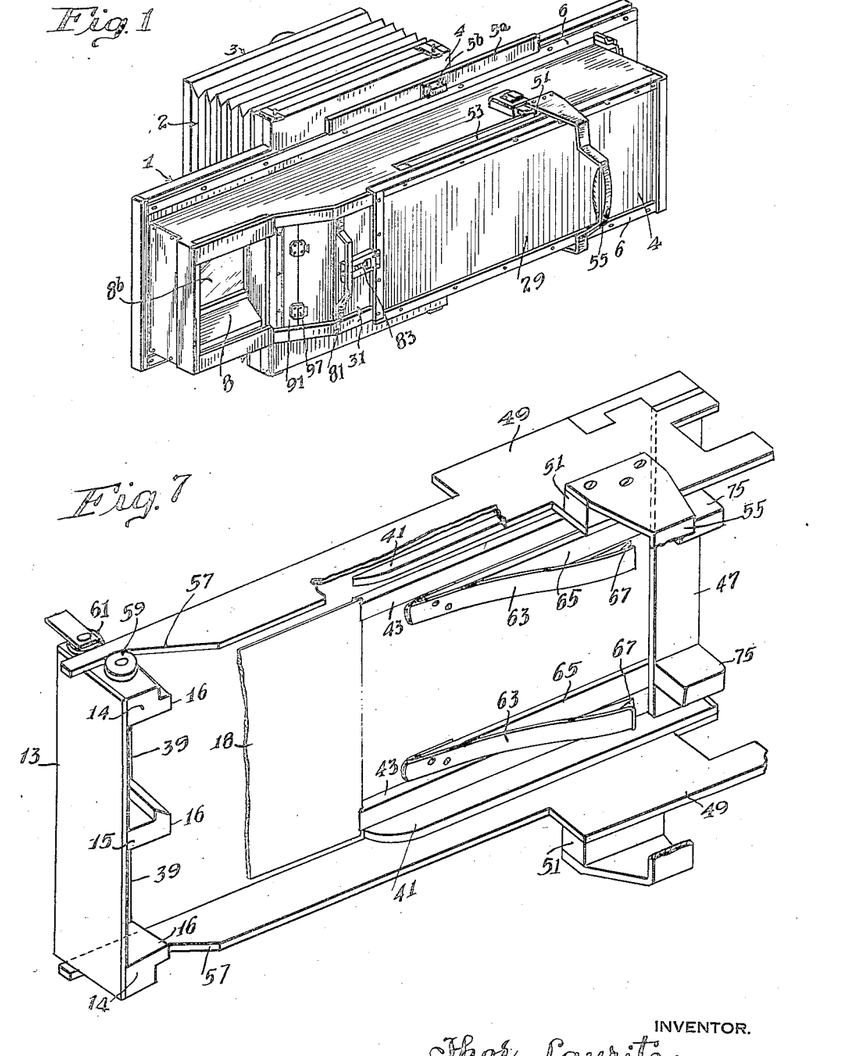
Fig. 1 is a perspective view of a complete camera in accordance with the invention.
Fig. 7 is a perspective view of the assembled reciprocating elements of the camera back as they would appear removed from the remainder of the camera structure.

The camera disclosed in Fig. 1 comprises a back 1 detachably connected to a bellows 2 which in turn connects to a lens board 3 carrying a lens and shutter. The lens and shutter do not appear in the view of Fig. 1 but they may be of standard construction since they do not constitute any part of the present invention.

The entire structure may be supported on any suitable tripod for studio use or, if desired, it may be held in the hands while being operated. The bellows 2 and lens board 3 function merely to provide a light tight enclosure connecting the back 1 to the lens and shutter. The back 1 contains all of the mechanism for supporting and shifting films and contains all of the features of the invention.

The back 1 comprises a board or base 4 adapted to be secured to the bellows 2 and having therein an exposure aperture 5 (Fig. 3) which is suitably aligned with the bellows 2 so that the image produced by the lens of the camera is projected therethrough. The board 4 functions as a track slidably supporting the rest of the back 1 for longitudinal movement with respect to the bellows 2. Thus the board 4 is provided with guide rails 6 which overlap flanges 7 (Fig. 4) on the main body of the back to permit free longitudinal movement while preventing lateral or rearward movement away from the board 4.

The purpose of making the back longitudinally shiftable with respect to the bellows 2 is to enable the operator to either bring the film-exposing aperture 5' (Fig. 3) or a focusing aperture 8 into position juxtaposed to the opening 5 in the board 4, opening 5 being juxtaposed to the lens of the camera. The focusing aperture 8 is provided with a ground glass 8b for making visible an image focused thereon by the lens of the camera. The board 4 may be provided with a slide 5a for closing the aperture 5 when it is desired to remove the entire back from the bellows 2, this slide 5a being actuated by a handle 5b (Fig. 1) on the board 4 exterior of the guide rail 6. Immediately back of the exposure aperture 7 is a magazine 9 for containing unexposed film. This magazine 9 comprises side walls 11 (Fig. 2) spaced apart a distance slightly greater than the width of the films to be employed and short walls 12 for engaging corners of the films and preventing movement of the films to the right. Movement of the films to the left (with reference to Fig. 2) is normally prevented by a rearwardly shiftable gate 13 having end posts 14 and a center post 15, all of which posts have front faces 16 spaced from the walls 12 a distance slightly greater than the length of the films.

Figure 3:
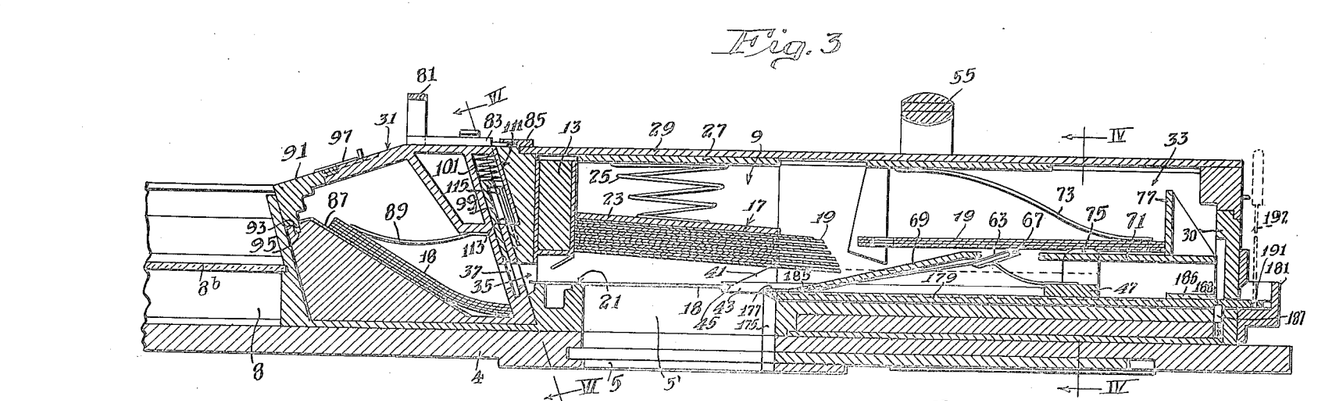
Fig. 3 is a longitudinal section through the camera back taken in the plane III—III of Fig. 2.

Referring to Fig. 3, (which discloses the mechanism in the process of discharging a film) the films 18 are arranged in a stack 17 and are separated by spacers 19. The front film of the stack normally rests against a wall 21 through which the exposure aperture 7 projects as a window of slightly smaller dimensions than the films. The stack 17 is normally compressed against the wall 21 by a backing plate 23 which is resiliently forced against the stack by a spring 25 secured to a removable collar 27. A removable back wall 29 effects a light tight closure for the film compartment 9.

Figure 2:
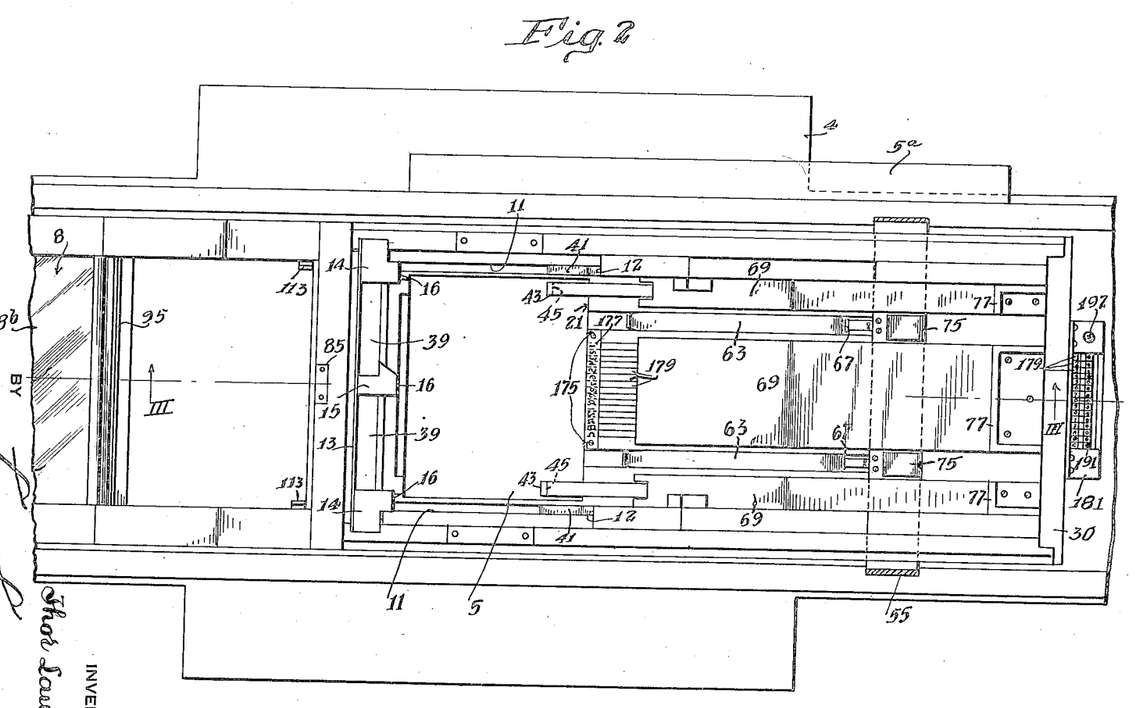
Fig. 2 is an elevation view of a part of the camera, looking into the back thereof, various elements being removed to show the numbering device.

The spacers 19 are substantially longer than the films 18 so that they overlap the latter at both ends in the compartment 9, this overlap being made possible by the fact that the spacers are narrower than the films so that they can project to the right beyond the walls or shoulders 12 (Fig. 2). On their left ends the spacers 19 have recessed corners to fit between the posts 14 and have a center recess adapted to fit over the post 15, the shapes of the spacers being clearly shown in Figs. 8 and 9.

As previously stated, the stack 17 is normally compressed against the wall 21 so that the front film of the stack lies in the plane of the rear surface of the wall 21 in the focus of the lens ready to be exposed. The exposure may be effected in the usual way by opening the shutter associated with the lens. Following exposure, the front film is shifted to the left (with reference to Fig. 3) into an exposed-film magazine 31 and the spacer 19 which overlie the front film is thereafter shifted to the right into a spacer magazine 33. The shifting is accomplished by a reciprocating mechanism to be described later.

Suffice it to say at this point that initial movement of the reciprocating mechanism to the left lifts the gate 13 to uncover an aperture 35 which is juxtaposed to an aperture 37 in the exposed-film magazine 31, thereby permitting free sliding movement of the front film into magazine 31. Upon completion of movement of the reciprocating element the gate 13 is again lowered to close the aperture 35. Gate 13 is provided adjacent its lower edge with a shelf 39, upon which the left ends of the spacer elements 19 rest. Therefore, upward movement of the gate 13 lifts the left ends of the spacers and the films back thereof clear of the front film 21, as shown in Fig. 3, to remove all pressure from the front film during its discharge into the magazine 31. At the same time film lifting wedges 41, which form a part of the reciprocating mechanism, slide under the side margins of the second film in the stack just within the side walls 11 and lift the right end of the stack clear of the front film, this position also being shown in Fig. 3. The front film is simultaneously ejected by a pair of pusher arms 43 (constituting a part of the reciprocating mechanism) having cleft ends 45 which engage with the rear edge of the film and move it into the exposed film magazine 31.

The reciprocating mechanism consists of a carriage slidable longitudinally within the camera back and includes a main cross head 47 (Fig. 4) which is secured on opposite sides to a pair of side members 49, which in turn are connected by blocks 51 projecting through slots 53 in the side walls of the camera back to the ends of a U-shaped actuating handle 55 positioned to the rear of the cover plate 29. The side members 49 are extended and constitute gate lifter wedges 57 for performing the operation of lifting the gate 13 previously described. Thus the gate 13 is provided on its opposite ends with rollers 59 adapted to be engaged by the wedges 57. Other rollers 61 mounted on stationary pivots bear against the opposite edges of the wedge arms 57 and oppose the thrust on the wedge arms of the gate rollers 59. The film pusher arms 43 and film lifter wedges 41 are attached directly to the cross head 47 for reciprocation therewith. The functions of members 43 and 41 have been previously described.

The reciprocable carriage also comprises a pair of spacer shifting arms 63 which project to the right or toward the spacer magazine 33 and are secured at their left ends to arms 65, the latter being attached at their right ends to the cross head 47. The spring arms 63 are provided with cleft ends 67 adapted to engage niches in the right end of the front spacer in the stack 17 upon movement of the reciprocating mechanism to the right, and carry the spacer into the spacer magazine 33.

The spacers 19 are normally restrained from movement to the right by the hooked center post 15 on the gate 13. However, the lower end of the hook portion of post 15 terminates slightly above the shelf 39 on the gate so that when the gate has been raised into the position shown in Fig. 3 by movement of the wedge arms 57 to the left, the front spacer on the stack which overlie the exposed film, which was shifted into the magazine 31, can slip off the lower end of the hook portion of post 15 and be carried to the right by the spring arm 63 upon the return movement to the right of the reciprocating mechanism. As the front spacer leaves the stack it rides up along an inclined track 69 in the spacer magazine, which track merges into a horizontal track 71, upon which the spacers are normally held flat by a spring 73.

During movement of a new spacer into the magazine 33 any spacers previously introduced therein are raised by projections 75 extending from the cross head 47. The projections 75 project through slots provided therefor in the tracks 69 and 71 and when the reciprocating mechanism is in normal position the projections 75 lie beyond stop members 77 which limit the movement of the spacers. The spring arms 63 also move through slots provided therefor in the tracks 69 and 71.

The mechanism so far described corresponds substantially with that disclosed in my Patent No. 1,992,223 and serves as a necessary foundation to explain the construction, operation and utility of the features which constitute the present invention. The operation of the mechanism so far described will now be briefly traced.

Following exposure of the front film in the stack, the reciprocating mechanism is moved to the left through the limits of its stroke and then to the right back to its original or normal position by means of the actuating handle 55. Initial movement to the left lifts the gate 13 clear of the aperture 35 and the gate in turn lifts all of the spacers and all of the films except the front film away from the latter. Thereafter the advancing wedges 41 lift the right end of the stack clear of the front film and the forked arms 43 engage the right edge of the front film and slide it into the exposed-film magazine 31. Upon reverse movement of the handle 55, the forked ends of the arms 63 hook into the front spacer of the stack and carry it into the spacer magazine 33. At the same time the wedges 41 are retracted and the gate 13 is lowered to cover the aperture 35 and lower the stack to press the next film against the wall 21 in position to be exposed.

Having described the general operation of the camera, the new features thereof constituting the present invention will now be described in detail.

*Removable exposed-film magazine with automatic door*

Figures 5, 6:
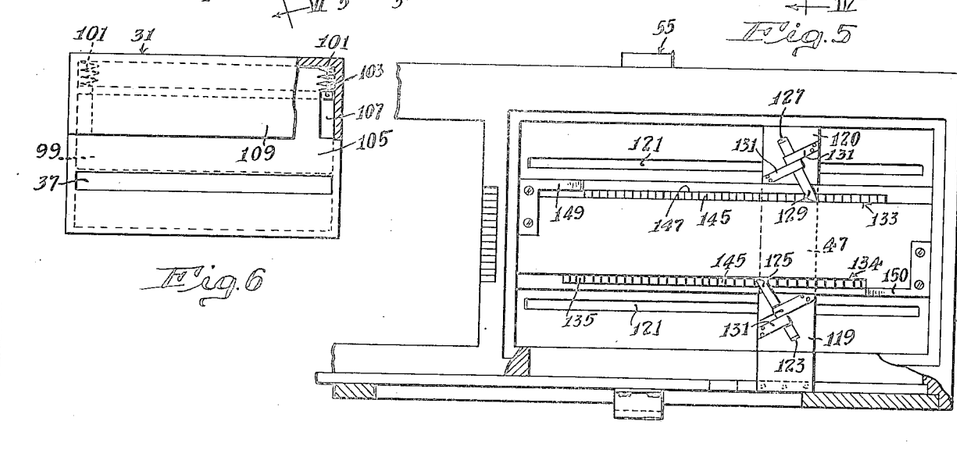
Fig. 5 is an elevation view looking into a portion of the camera back from the front end, the back being removed from the camera proper.
Fig. 6 is a detail view of one face of the exposed-film magazine with a portion of the wall broken away to show the construction, the direction of the view being indicated by the arrows VI—VI in Fig. 3.

Referring to Figs. 1, 3 and 6, the exposed-film magazine 31 comprises a light tight box dimensioned to slide into a recess provided therefor in the camera back. To facilitate insertion and removal of the magazine the latter is provided with a handle 81, and to maintain the magazine in position a latch 83 is provided which engages with a catch 85. The latch 83 is preferable self-locking so that it locks automatically when the magazine is pressed into position.

The interior of the magazine is provided with an inclined wall surface 87, which is preferably smooth and polished, upon which the first film impinges as it is pushed into the magazine and against which the first film rests after it has been released by the pusher arms 43. To retain the films against the wall 87 a spring clip 89 is preferably provided. A door 91 is provided for the removal of films (this removal being performed in a dark room after the magazine has been removed from the camera). As shown, the door 91 is located at the corner of the magazine substantially opposite the opening 37 through which the films enter. To secure the door 91 in closed position it is provided with a tongue 93 which engages with a groove 95 in the body of the magazine and a pair of latches 97 is provided to secure the other edge of the door to the adjacent wall of the opening. Due precautions must be taken, of course, in the design of the door 91 to effect a light seal about its edges.

To close the opening 37 in the magazine and prevent the entry of light therethrough when the magazine is removed, an automatically actuated slide 99 is provided, this slide being slidable in grooves provided therefor in the wall of the magazine so that it is movable from a position completely blocking the opening 37 into the open position shown in Fig. 3. Automatic closure of the slide 99 when the magazine is removed from the camera is obtained by helical springs 101 which bear against the upper edge of the slide and tend constantly to urge it into closed position. To open the slide when the magazine is inserted in the camera the slide is provided with a pair of forwardly projecting arms 103 which extend through an intermediate wall 105 of the magazine and slide in grooves or slots 107 provided therefor. Overlying the wall 105 and extending down over the slots 107 is an outer wall 109 which is preferably relatively thin, and bears against the wall 111 of the recess into which the magazine slides. The wall 111, instead of being in the same plane throughout, is offset to provide a shoulder 113 which bears against the lower edge of the wall 109 and projecting upwardly from the shoulder 113 are a pair of prongs 115 which register with the slots 107 in the magazine and bear against the arms 103 to lift the latter and the slide 99 as the magazine is pressed into position in the camera back. There is substantially no possibility of the slide 99 being accidentally opened when the magazine is removed from the camera by virtue of the fact that the wall 109 completely overhangs and protects the arms 103 against accidental contact with any object that might shift them.

The shoulder 113 also serves as a light-lock to prevent fogging of films in transit into the magazine 31. It is also to be observed that the shoulder 113 is proportioned in construction so as to allow the slide mechanism of magazine 31 to close the opening 37 before the magazine is retracted far enough to permit light to enter the magazine recess past the outer wall 109 of the magazine.

*Clutch mechanism for preventing reverse movement of the reciprocating mechanism*

Figure 4:
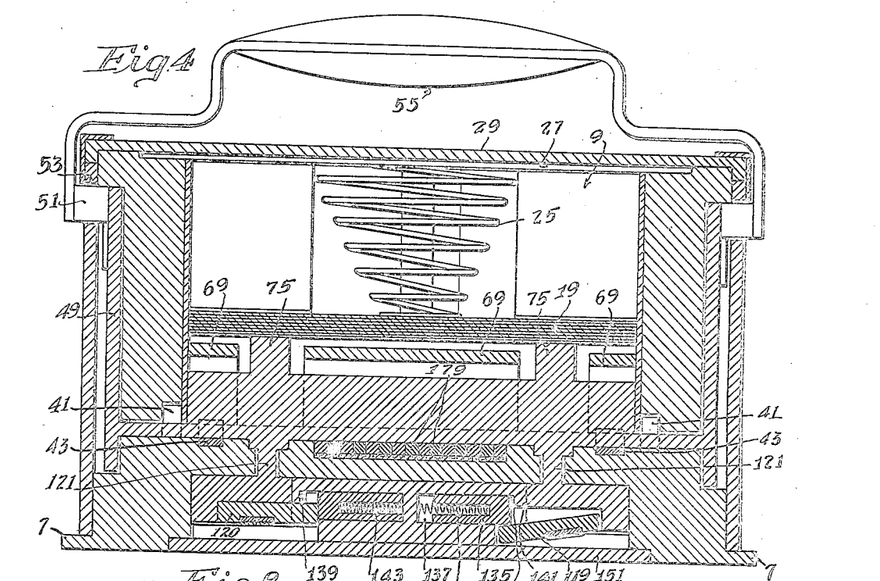
Fig. 4 is a cross section through the camera back taken in the plane IV—IV of Fig. 3.

As has been previously described, in normal operation the handle 55 is shifted continuously from one end of its stroke to the other and then back again to the starting point. Should the operator, through carelessness or ignorance, shift the handle part-way in one direction and then move it backwards, the forked ends 45 of the film shifting arms 43 might become disengaged from the film being pushed and fail to reengage the film upon subsequent movement in one direction, or the forked end of arm 63 might release the spacer with which it was engaged and fail to reengage the spacer upon subsequent movement in the proper direction. It is therefore highly desirable to provide some automatic means for preventing even slight reverse movements of the reciprocating mechanism within either the forward or the backward stroke. To this end, I provide a ratchet or clutch mechanism which is illustrated in Figs. 4 and 5 and will now be described with reference to those figures.

Attached to the cross head 47 and mounted for longitudinal sliding movement in a recess in the front wall of the camera back are a pair of blocks 119 and 120, these members being joined to the cross head 47 by connecting members 121 extending through slots provided therefor in the stationary wall member. Block 119 has a groove 123 in its front face in which is loosely mounted a detent 125, and block 120 has a groove 127 in its front face in which is loosely mounted a detent 129. Each detent is restrained from longitudinal movement in one direction by the end of the slot in which it is positioned and is resiliently held against movement forwardly out of the slot by a pair of flat retaining springs 131. As shown in Fig. 5, the inner ends of the detents are tapered to edges and are positioned to drag along a row of yieldable keys 133 and 134, respectively. As shown to best advantage in Fig. 4, each key 135 in both rows 133 and 134 is mounted for sliding movement longitudinally (laterally with respect to the longitudinal axis of the row or of the camera), all of the keys in each row being positioned in slots 137 in the wall member of the camera back. Each key is constantly urged outward against a shoulder 141 (which shoulder limits its outward movement) by a helical spring 143. It will be observed that each row of keys normally presents a substantially continuous surface on the front face 145 and on the end face 147.

As shown in Fig. 5, the cross head 47 and the detent blocks 119 and 120 are being moved to the left. Under this condition the detent 129 lies in its slot and projects into the row of keys 133, the detent successively depressing and releasing the keys in the row as it traverses them. It will be observed that immediately the detent passes a key the latter springs out into normal position, thereafter presenting its edge to the point of the detent 129 and preventing any movement of the detent, or the block carrying it, to the right. However, during this movement no resistance is offered to the detent 125 by the row of keys 134 because the detent 125 is resting against the face 145 of the keyboard, being urged thereagainst by the springs 131, and slides along the substantially continuous surface of the row of keys. However, when the detents have moved to the left to the limit of the stroke of the cross head 47, the detent 125 drops off the last key at the left end of row 134 and thereafter bears against the ends of the keys in that row, depressing them during the succeeding movement to the right, exactly as the detent 129 depressed the keys in row 133 during the preceding movement just described. At the end of the stroke to the left the detent 129 rides up onto an inclined plane 149 which lifts it above the plane of the surface 145 of the last key in the row. That key therefore restores itself to normal position and during the succeeding movement to the right the detent rides along the surface 145, thereby offering no substantial resistance to the movement of the carriage. A wedge or inclined plane 150 is also provided at the right end of row 134 to lift detent 125 away from the teeth in row 134 at the completion of the movement to the right.

The keys 135 are preferably constructed of some non-metallic material such as hardwood or fiber to reduce the noise of their impact with the shoulder 141 as they are released by the detents. Furthermore, the shoulder 141 is padded by a layer of felt 139 across the shoulder. The detents 129 are also preferably of non-metallic material. As a result of the construction described and the use of non-metallic materials, the automatic clutch or ratchet mechanism is relatively quiet and at the same time is positive in operation and not likely to get out of order.

As shown in the sectional view of Fig. 4, the entire clutch mechanism is normally concealed and protected from dust by a cover plate 151.

*Stop plate for preventing reciprocation of the actuating mechanism after discharge of last film.*

Figure 8:
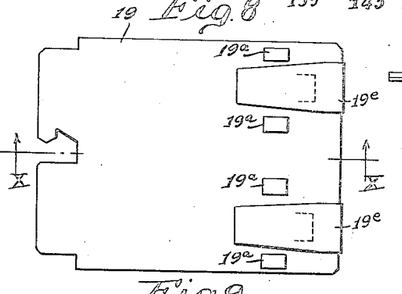
Fig. 8 is a plan view of one side.
Figure 9:
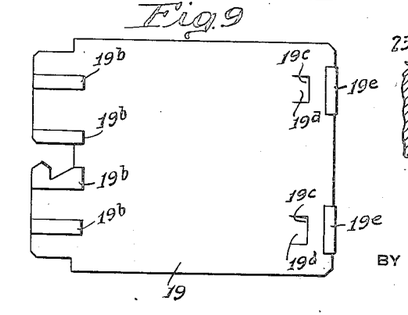
Fig. 9 is a plan view of the opposite side of one of the spacer elements used in the camera.
Figure 12:
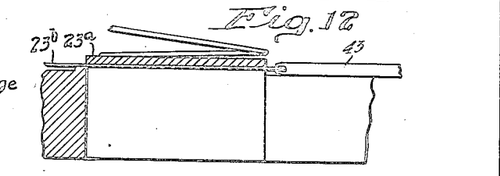
Fig. 12 is a detail sectional view illustrating the operation of the pressure plate as a stop device.

In the camera as heretofore described there is nothing to prevent an operator from continuing to reciprocate the handle 55 after all the films in stack 17 have been exposed and discharged into the exposed-film magazine 31. Furthermore, except for a slight difference in the feel of the device, there is nothing to indicate to the operator that the films are exhausted and he might try to take pictures after all the films were used up. To prevent such possibility, I therefore provide a special construction of the backing plate 23 whereby reciprocation of the film shifting mechanism is prevented following the discharge of the last film and spacer in the stack. This backing plate comprises a relatively thick rigid slab 23a (Fig. 12) having a thinner plate 23b secured to the front surface thereof. The slab 23a is of the same dimensions as the films so that it is guided by the walls 11 and the shoulders 12. The plate 23b, on the other hand, has approximately the same dimensions as the spacer elements 19. Thus at the left end it is shaped to fit about the center post 15 having a niche for that purpose similar to the niches in the spacers which are illustrated in Figs. 8 and 9.

Figure 11:
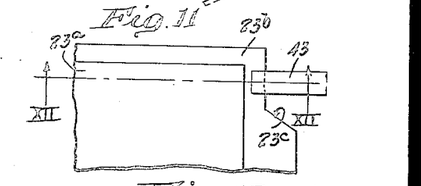
Fig. 11 is a detail plan view of a corner of the pressure plate for compressing films and spacer elements in the camera.

At the right end, however, the plate 23b has recesses cut out at the corners, as shown at 23c in Fig. 11, to retract the portions of the end margin adjacent the sides sufficiently to permit them to be engaged by the film pusher arms 43 after all of the films and spacers underlying the plate 23b have been discharged.

In view of the fact that the left end of the plate 23b abuts against the gate 13, it is impossible for the plate to be moved to the left so that when the film pusher arms 43 engage the right edge of the plate they are restrained from further movement. Since the film pusher arms 43 are rigidly connected to the reciprocating cross head and the actuating handle 55, the latter are blocked against movement and no reciprocation of the handle 55 can be effected by the operator. This failure of the parts to reciprocate definitely indicates to the operator that the magazine is empty and that the camera must be taken into a dark room and reloaded before further exposures can be made.

It should be noted particularly that it is impossible for the film pusher arms 43 to engage the backing plate 23 so long as there are spacers in the stack since the spacers extend above and over the ends of the pusher arms 43 and prevent any possible contact between the cleft ends of the arms and the edge of the backing plate.

*Built-up spacers for preventing bulging of films in the stack*

It will be observed from Fig. 3 that whereas the backing plate 23 exerts a pressure substantially uniformly over the entire back area of the last spacer 19 in the stack, that the only opposing force on the front end of the stack is that exerted by the narrow wall 21 surrounding the exposure aperture 7. Therefore, in view of the resilient nature of the films and spacers in the stack, the latter tends to bulge forwardly and force the center portion of the front film forward of the plane of the rear face of the wall 21, which represents the focal plane of the camera.

Obviously it is very essential in an accurate camera that the film be maintained substantially flat in the focal plane. I have found it desirable therefore, in order to prevent bulging of the films, to make the spacers slightly thicker back of the end margins of the films than at the center. This thickening of the spacers may be done in various ways, depending upon the mode of manufacture of the spacers. However, since I prefer to manufacture the spacers from thin paper or fiber sheet stock, I have found it convenient to increase the thickness by gluing or cementing small reinforcements onto the spacers. Thus referring to Fig. 8, I prefer to cement a plurality of small rectangular tabs 19a to the rear faces of the spacers, positioning these tabs such a distance from the right margins of the spacers that they are substantially juxtaposed to the right margins of the films in the stack.

The thickness of the left margin of each spacer is likewise increased by cementing tabs 19b thereto, these tabs extending from the left end of the spacer to a point substantially juxtaposed to the plane of the adjacent edge of the exposure aperture 7.

The tabs 19a are positioned on the rear faces of the spacers so that new spacers entering the spacer magazine 33 will not catch on the tabs on the spacer previously discharged into the magazine. Thus referring to Fig. 3 and the operation of the spacer discharge mechanism as previously described, it will be noted that each new spacer is carried into the spacer magazine along the inclined plane 69 and then drags along the under side of the last spacer. Therefore, if the under side of the right half of the previously discharged spacer were not smooth, then the advancing edge of the newly introduced spacer might catch thereon. On the other hand, it is desirable that the trailing end (the left edge in Fig. 3) of each spacer be smooth on the upper side to prevent the spacer from dragging on or scratching the overlying film in the stack as the spacer moves thereunder. The tabs 19b are therefore positioned on the under side of the spacers where they can in no way interfere with the operation. These tabs produce no interference in the spacer magazine 33 because a spacer while being introduced into the magazine does not contact the face of the last removed spacer adjacent the trailing end thereof since the latter are positioned a substantial distance above the inclined track 69, as shown in Fig. 3.

In my Patent No. 1,992,223 several types of niches or windows in the spacers to permit engagement of the spacers by the spacer shifting arm 63 were described. In accordance with the present invention, I prefer to form these niches by merely making U-shaped cuts 19c through the spacers, thereby creating a flap 19d which yields upwardly when contacted by the forked ends of the arms 63 to permit the latter to engage the transverse edge of the cut 19c, as shown in dotted lines in the sectional view of Fig. 10.

Figure 10:
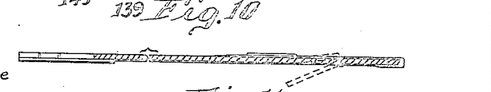
Fig. 10 is a longitudinal section through one of the spacer elements, the section being taken in the plane X—X of Fig. 8.

To prevent any possibility of the cleft end of the arms 63 from simultaneously engaging more than one spacer, I provide reinforcement strips 19e on the back of each spacer, these strips being tapered in thickness as shown at 19e in Fig. 10 and cemented at one end to the back of the spacer. The strips extend beyond the leading edge of the spacer and are folded back on the under side and cemented at that point as clearly shown in Fig. 10. By virtue of the fact that the reinforcing strips 19e extend over the leading edge of the spacer, they present no sharp or blunt edges or corners to engage with previously discharged spacers in the spacer magazine.

*Film numbering magazine*

In the camera disclosed in my Patent No. 1,992,223 no means was disclosed for marking exposed-films with identifying symbols or numbers. In accordance with the present invention, such a system is provided and will now be described with reference to Figs. 2, 3 and 4. Referring first to Figs. 2 and 3, that portion of the wall 21 constituting the right margin of the exposure aperture 7 is recessed at 175 to a depth substantially equal to, although preferably slightly less than, the overlapping margin of the films, to permit light from the camera lens (during the normal exposure of the film) to be projected into the margin of the film. This recess is covered in the plane of the rear face of the wall 21 with a stencil 177 of some thin transparent material, such as celluloid, which stencil bears a number of symbols. Thus there is shown on the drawings a stencil bearing the numbers consecutively from 1 to 9, together with the letters A, B and C. Obviously any other symbols or combinations of letters and numbers may be employed. The symbols may be opaque on a transparent ground or they may be transparent on an opaque ground. By virtue of the fact that the stencil is positioned immediately adjacent the front film, the shadow of the stencil prints the numbers on the edge of the film.

To permit selection of different symbols or different combinations of the symbols on the stencil, a plurality of slides 179 are provided for individually covering the different symbols, these slides being positioned below the stencil 177 and mounted side by side for longitudinal movement from positions underlying the stencil to positions retracted therefrom. Thus the slides 179 are preferably of such length as to extend through the right hand end wall 30 of the back into a protecting cup or enclosure 181 secured to the wall 30. All the slides 179 fit closely against each other and are held in place by restraining guides 185 and 186 at opposite ends thereof.

Spring detents 187 engageable with niches 188 in the individual slides may also be provided for restraining free longitudinal motion of the slides. On their outer ends, which project into the cup 181, (Fig. 2) the slides bear visible indicia corresponding to the indicia of the stencils which they are adapted to cover. Each slide is also provided with a small aperture 191 into which an actuating pin 192 may be inserted by the operator to retract the slide. The device functions as follows:

In the position shown in Fig. 2 all of the symbols in the stencil 177 are covered by the slides 179 so that if a film were exposed no symbols whatever would be printed on the margins of the film. Now assume that the operator wishes to mark a film with the numeral 1. He will insert the end of the tool 192 in the aperture 191 of the slide marked "1" and pull it outwardly until it strikes the end wall of the cup 181. This uncovers the symbol "1" of the stencil 177 to print "1" on the margin of the film. Obviously by retracting different slides 179, various numbers, letters or combinations of numbers and letters may be printed on the film at the time the exposure is made.

While I have disclosed and described a particular embodiment of my invention for purposes of illustration, it will be obvious to those skilled in the art that various changes in the specific construction shown may be made without departing from the invention, which is to be limited only as set forth in the appended claims.

I claim:

1. In a magazine camera for cut-film, means for supporting films in position to be exposed, means for ejecting exposed-films from said supporting means, the latter comprising a wall having an aperture therein through which exposed-films are ejected, a magazine for receiving exposed-films ejected through said aperture, said magazine comprising a detachable container having an opening in one end for receiving films with door means for closing said opening, means for releasably attaching said magazine to said camera in operative relation thereto with said opening on the magazine juxtaposed to said aperture, and means responsive to movement of said magazine into said operative relation to said camera for opening said door means and responsive to removal of the magazine from the camera for closing said door means.

2. In a magazine camera for cut-film, means for supporting films in position to be exposed, means for ejecting exposed-films from said supporting means, the latter comprising a wall having an aperture therein through which exposed-films are ejected, a magazine for receiving exposed-films ejected through said aperture, said magazine comprising a detachable container having an opening in one end for receiving films with door means for closing said opening, means for releasably attaching said magazine to said camera for operative relation thereto with said opening on the magazine juxtaposed to said aperture, spring means for normally closing said door means, and cooperating means on said camera and said magazine, respectively, responsive to movement of said magazine into said operative relation to said camera for opening said door means against the pressure exerted by said spring.

3. In a magazine camera having means for shifting films, which means includes a carriage reciprocable through a predetermined stroke for each film shifting operation, means for preventing reverse movement of said carriage within the limits of each stroke comprising a row of keys extending parallel to the path of movement of said carriage, said keys having flush faces on one side approximating a continuous elongated surface and each key being supported against movement in a direction perpendicular to said surface, the ends of said keys being normally flush with each other, each key being individually resiliently supported to yield inwardly in response to pressure on the end thereof, a detent attached to said carriage for movement therewith along said row of keys, said detent being movable between two positions, in one of which it projects into said row of keys at an angle whereby it successively depresses and releases the keys in response to movement in one direction but engages against the edges of the keys as it passes them to block movement in the opposite direction, and in the other of which positions said detent rests against said flush faces of said keys for sliding movement therealong.

4. In a magazine camera having means for shifting films, which means includes a carriage reciprocable through a predetermined stroke for each film shifting operation, means for preventing reverse movement of said carriage within the limits of each stroke comprising a row of keys extending parallel to the path of movement of said carriage, said keys having flush faces on one side approximating a continuous elongated surface and each key being supported against movement in a direction perpendicular to said surface, the ends of said keys being normally flush with each other, each key being individually resiliently supported to yield inwardly in response to pressure on the end thereof, a detent attached to said carriage for movement therewith along said row of keys, said detent being movable between two positions, in one of which it projects into said row of keys at an angle whereby it successively depresses and releases the keys in response to movement in one direction but engages against the edges of the keys as it passes them to block movement in the opposite direction, and in the other of which positions said detent rests against said flush faces of said keys for sliding movement therealong, and means for shifting said detent into one of said positions when at one end of said row of keys and means for shifting the detent into the other of said positions when at the other end of said row.

5. In a magazine camera having means for shifting films, which means includes a carriage reciprocable through a predetermined stroke for each film shifting operation, means for preventing reverse movement of said carriage within the limits of each stroke comprising a row of keys extending parallel to the path of movement of said carriage, said keys having flush faces on one side approximating a continuous elongated surface and each key being supported against movement in a direction perpendicular to said surface, the ends of said keys being normally flush with each other, each key being individually resiliently supported to yield inwardly in response to pressure on the end thereof, a detent attached to said carriage for movement therewith along said row of keys, said detent being movable between two positions, in one of which it projects into said row of keys at an angle whereby it successively depresses and releases the keys in response to movement in one direction but engages against the edges of the keys as it passes them to block movement in the opposite direction, and in the other of which positions said detent rests against said flush faces of said keys for sliding movement therealong, means resiliently urging said detent into said first-mentioned position, and cam means at the end of said row approached by said detent during movement in said one direction for shifting said detent from said first into said second position, said detent moving off the end of the row at the completion of movement in said opposite direction whereby it is automatically restored by said resilient means to said first position.

6. In a magazine camera for cut-film, means for supporting a stack of cut-films, thin opaque spacers longer than the films and adapted to be interposed therebetween in said stack, said means for supporting said stack comprising a front wall containing an exposure window, and spring means for compressing the stack against said front wall, a reciprocable actuating member, means comprising a pusher arm positioned substantially in the plane of the rear surface of said front wall, said arm being connected to said actuating member, for shifting the front film transversely away from said stack in response to movement of said actuating member in one direction, means spaced from the edge of the films in said stack for deflecting the edges of said spacers in the stack rearwardly of the path of movement of said pusher arm, other means connected to said actuating member for shifting the front spacer in said stack transversely away from said stack in the opposite direction during return movement of said actuating member, and a film backing element positioned back of the last spacer in said stack having an edge in alignment with the edges of said film in said stack for engaging said pusher arm following discharge of the last spacer and thereby preventing further reciprocation of said actuating member.

7. In a magazine camera for cut-film, means for supporting a stack of cut-films, thin opaque spacers longer than the films and adapted to be interposed therebetween in said stack, said means for supporting said stack comprising a front wall containing an exposure window, and spring means for compressing the stack against said front wall, a reciprocable actuating member, means comprising a pusher arm positioned substantially in the plane of the rear surface of said front wall, said arm being connected to said actuating member for shifting the front film transversely away from said stack in response to movement of said actuating member in one direction, means spaced from the edge of the films in said stack for deflecting the edges of said spacers in the stack rearwardly of the path of movement of said pusher arm, other means connected to said actuating member for shifting the front spacer in said stack transversely away from said stack in the opposite direction during return movement of said actuating member, and means positioned back of the last spacer in said stack for intercepting said pusher arm following discharge of the last spacer and thereby preventing further reciprocation of said actuating member.

8. In a magazine camera for cut-films, means for supporting cut-films in a stack, said means comprising a front wall containing an exposure window of slightly smaller dimensions than the films, and spring means for compressing the stack against said front wall, spacer elements interposed between successive films in said stack, means for successively shifting films and spacers transversely from the front of said stack to bring new films into exposing position against said window, said spacers having thickened portions juxtaposed to opposite margins of said films and opposite margins of said window for concentrating the pressure exerted by said spring means on said stack in the margins of the films and thereby preventing bulging of the front film through said window.

9. In a magazine camera back for cut-film, means for supporting a stack of cut-film, said means comprising a front wall having a window therein defining an exposure aperture, and an end wall having an exposed-film discharge aperture therein, means at the opposite end of said stack, defining a spacer discharge passage, a spacer magazine beyond said passage, a plurality of spacers for insertion between adjacent films in said stack, each spacer comprising a thin sheet of flexible opaque material of substantially greater length than said films, whereby said spacers when stacked with said films project beyond the films into the spacer discharge passage, film shifting means reciprocable substantially in the plane of the front film of said stack for engaging with the edge of the front film of said stack and pushing it through said film discharge aperture, other reciprocable means reciprocating substantially in the plane of said front wall in a path extending from a point in front of said stack into said spacer magazine, cooperating means on said other reciprocable means and on the projecting ends of said spacers for producing driving engagement between said other reciprocable means and the front spacer in said stack to shift the front spacer into said spacer magazine, during movement of said other reciprocable means from said point in front of said stack into said spacer magazine, and means for actuating said two reciprocable means in timed relation, each of said spacers having a protuberance thereon on its rear face adjacent its leading edge and juxtaposed to the adjacent margins of the films in the stack and also having a protuberance on its front face adjacent its trailing edge and juxtaposed to the adjacent margin of the films in the stack, said protuberances increasing the thickness of said spacers in line with the margins of the films to reduce the stack pressure at the centers of the films.

10. In a magazine camera back for cut-film, means for supporting a stack of cut-film, said means comprising a front wall having a window therein defining an exposure aperture, and an end wall having an exposed-film discharge aperture therein, means at the opposite end of said stack, defining a spacer discharge passage, a spacer magazine beyond said passage, a plurality of spacers for insertion between adjacent films in said stack, each spacer comprising a thin sheet of flexible opaque material of substantially greater length than said films, whereby said spacers when stacked with said films project beyond the films into the spacer discharge passage, film shifting means reciprocable substantially in the plane of the front film of said stack for engaging with the edge of the front film of said stack and pushing it through said film discharge aperture, other reciprocable means reciprocating substantially in the plane of said front wall in a path extending from a point in front of said stack into said spacer magazine, cooperating means on said other reciprocable means and on the projecting ends of said spacers for producing driving engagement between said other reciprocable means and the front spacer in said stack to shift the front spacer into said spacer magazine, during movement of said other reciprocable means from said point in front of said stack into said spacer magazine, and means for actuating said two reciprocable means in timed relation, in which said cooperating means on said other reciprocable means comprises a resilient rearwardly extending finger and the cooperating means on each spacer comprises a slit in the edge of the spacer, the latter having a thin sheet reinforcement on its rear face overlying said slit and secured to the spacer at points removed from said slit.

THOR LAURITZ.